United States Patent
Wang et al.

(10) Patent No.: US 6,703,733 B1
(45) Date of Patent: Mar. 9, 2004

(54) REMOVABLE SELF-LOCKING FIELD WINDING BLOCK

(75) Inventors: Yu Wang, Clifton Park, NY (US); Christopher Anthony Kaminski, Niskayuna, NY (US); Robert John Nygard, Saratoga Springs, NY (US); James Pelligrino Alexander, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 49 days.

(21) Appl. No.: 09/718,241

(22) Filed: Nov. 22, 2000

Related U.S. Application Data

(60) Provisional application No. 60/169,241, filed on Dec. 6, 1999.

(51) Int. Cl.$^7$ .............................. H02K 3/48; H02K 1/24
(52) U.S. Cl. ...................... 310/85; 310/264; 310/262; 310/261; 310/214
(58) Field of Search .................. 310/85, 264, 261–262, 310/269, 214

(56) References Cited

U.S. PATENT DOCUMENTS

| | | | |
|---|---|---|---|
| 2,720,605 A | 10/1955 | Herd | 310/194 |
| 4,152,611 A | 5/1979 | Madsen | 310/61 |
| 4,409,502 A | * 10/1983 | McCabria | 310/165 |
| 5,015,904 A | * 5/1991 | Kleemann | 310/179 |
| 5,036,238 A | * 7/1991 | Tajima | 174/DIG. 21 |

FOREIGN PATENT DOCUMENTS

| | | |
|---|---|---|
| DE | 1197970 | 8/1965 |

* cited by examiner

*Primary Examiner*—Dang Le
*Assistant Examiner*—J. Aguirrechea
(74) *Attorney, Agent, or Firm*—Patrick K. Patnode; Christian G. Cabou

(57) ABSTRACT

A multi-pole electric machine rotor assembly includes a rotor forging including a rotor body having poles 13 with pole faces and a winding module including a plurality of field windings positioned adjacent the pole faces and winding insulators disposed between each successive pair of the field windings, respectively. A winding block, disposed in engagement with the winding module, is shaped to be shifted to a final position relative to the winding module when the rotor assembly rotates at about its rated speed to thereby compress the winding module. Either the winding block or the winding module can be displaced by centrifugal forces during rotation. In the final position, the winding block is locked by friction in a position to maintain compression in the winding module. The winding block serves to provide a pre-stress in the field windings to keep the field windings tight over the design range of spin speeds, thereby controlling winding position and reducing alternating radial movement.

6 Claims, 3 Drawing Sheets

REMOVABLE SELF-LOCKING FIELD WINDING BLOCK

This application claims the benefit of U.S. Provisional Patent Application Serial No. 60/169,241, filed Dec. 6, 1999, the entire content of which is herein incorporated by reference.

BACKGROUND OF THE INVENTION

This invention relates to multi-pole electric machines and, more particularly, to a self-locking block for a field winding in a rotor assembly.

In a conventional electric machine such as a generator having a rotor and a stator, the rotor is provided with field windings that excite the machine while receiving current from an excitation source. The stator is provided with armature windings from which electrical power is provided.

Conventional rotors include axially oriented slots to restrain the winding against centrifugal forces. At the end regions, retaining rings or the like are used to contain the end windings. Due to different radial stiffness of the rotor and retaining ring, bending stresses are generated, and material fatigue becomes a concern. A loose winding may also cause motion of mass, resulting in balance drifts. The issue becomes more significant when lower stiffness composite materials are used for the retaining rings.

It is thus desirable to develop a robust field winding blocking system to control winding position and to reduce its movement on the rotor. Winding blocks can provide adequate pre-stress to keep the winding tight over the design range of spin speeds and provide a well-defined reference position, preventing peripheral dissymmetry in the rotor.

BRIEF SUMMARY OF THE INVENTION

In an exemplary embodiment of the invention, a rotor assembly includes a rotor forging having a rotor body with pole faces, a winding module including a plurality of field windings positioned adjacent the pole faces and winding insulators disposed between each of the field windings, respectively, and a winding block disposed in engagement with the winding module. The winding block is shaped to be shifted to a final position relative to the winding module when the rotor assembly rotates at about its rated speed to thereby compress the winding module.

In another exemplary embodiment of the invention, a multi-pole electric machine rotor assembly includes a rotor forging having a rotor body with poles extending along the direct axis and fins extending along a quadrature axis. Each pole includes a pole face extending generally perpendicularly to the direct axis. A winding module includes a plurality of field windings positioned in spaces between the pole faces and the fins. Winding insulators are disposed between each of the field windings. A winding block is disposed between the winding module and a corresponding one of the fins in each of the spaces between the pole faces and the fins. Preferably, a winding block is movably detached from the fins and the winding module. The winding block may include a support surface engaging a corresponding one of the fins and a tapered surface engaging the winding module. At least one angle of the tapered surface is preferably selected such that the winding block is shifted to a final position when the rotor assembly rotates at about its rated speed. A friction coefficient of the tapered surface may also be selected such that the winding block is shifted to its final position when the rotor assembly rotates at about its rated speed. The winding block is preferably formed of a flexible insulating material.

DETAILED DESCRIPTION OF THE INVENTION

Figure 1:
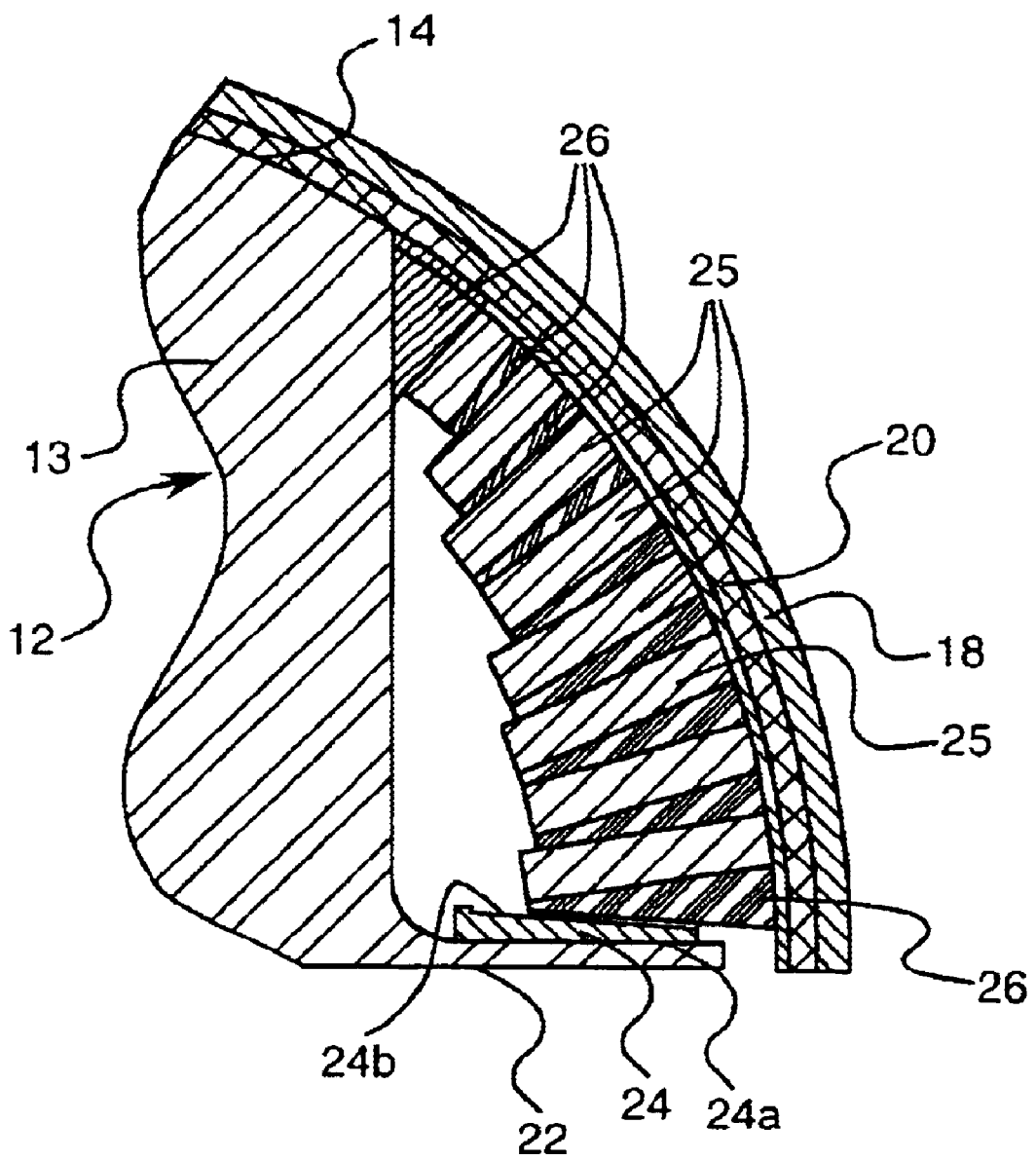
FIG. 1 is a cross sectional view of the rotor assembly of the invention.
Figure 2:
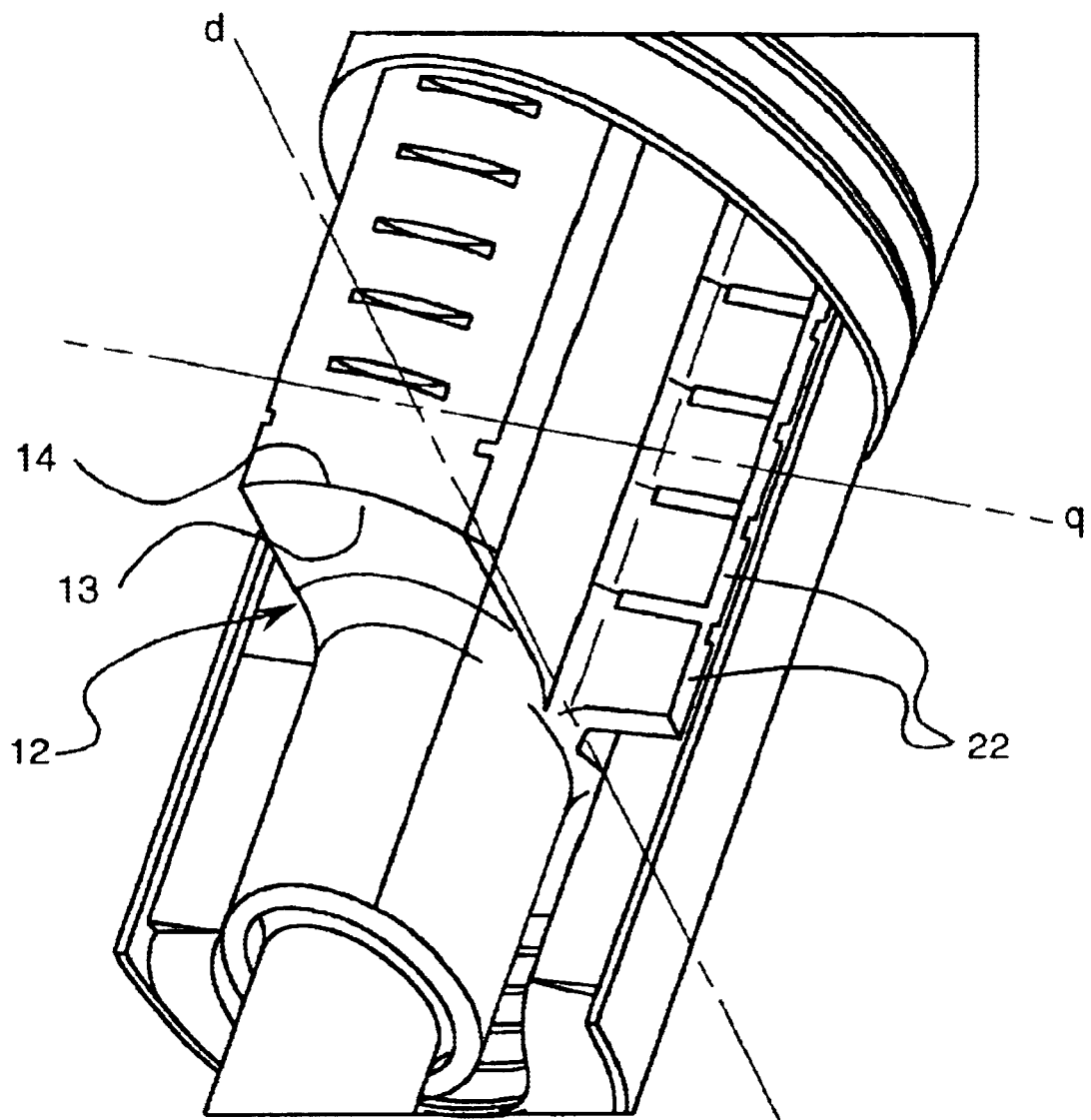
FIG. 2 is a perspective view of the rotor forging without the winding assemblies installed thereon.

FIG. 1 is a partial cross section of a rotor assembly 10 including a two-pole rotor forging 12 with poles 13 directed along the d axis (direct axis) and having pole faces 14 extending substantially perpendicularly to the d axis. Winding assemblies 16 are slid over parallel sides of poles 13, and the entire rotor assembly is contained within a tubular rotor housing 18. FIG. 2 is a perspective view of the rotor assembly before the winding assemblies are slid over the parallel sides of poles 13. This three-dimensional representation illustrates the poles extending along the d axis and fins 22 extending along the q axis (quadrature axis). As shown in FIG. 1, a shield 20 or the like may also be interposed between housing 18 and both rotor forging 12 and winding assembly 16 as shown.

In order to increase a section bending moment of inertia along the q-axis, fins 22 may be arranged to extend along the q-axis as part of rotor forging 12. The fins provide a well-defined position reference for winding modules 16, as well as a well-defined locking interface for spacer blocks 24 between winding modules 16.

As shown, in FIG. 1, winding modules 16 include a plurality of field windings 25 positioned in spaces between pole faces 14 and fins 22. A winding insulator 26 is interposed between each successive pair of field windings, respectively. A spacer block (or winding block) 24 is preferably disposed between each winding module 16 and a corresponding one of fins 22, respectively, in each space between a pole 13 and a corresponding one of fins 22.

Winding blocks 24 include a support surface 24a engaging a corresponding one of fins 22 and a tapered surface 24b engaging winding modules 16. The winding blocks are preferably formed of a flexible insulating material, such as a glass fiber reinforced composite, having a friction coefficient that effects a locked position of the winding blocks.

As the rotor spin speed increases during operation, winding blocks 24 are shifted radially outward by centrifugal force, locking in their final positions at or slightly above rated speed. The winding blocks are particularly configured to achieve this result; that is, the parameters of winding blocks 24, including the angle of the tapered surface, the friction coefficient, the length of the blocks, etc., determine the manner and extent to which winding blocks 24 react during operation. Preferably, the winding blocks are engineered to have minimum resistance for radially outward motion, and a friction angle that substantially prevents radially inward motion. Using statistical analysis, the amount of slack in the windings during operation, resulting from assembly clearances, tolerance take-up during rotation, etc., is determined. Based on length of the block, the block friction angle that will significantly reduce or eliminate slack in the windings at or about rated speed, is determined within a standard deviation.

When the rotor returns to zero speed, winding blocks 24 are locked in their final positions by friction and maintain the compression and tightness in winding modules 16; that is, although winding blocks 24 can be readily removed, in their final positions, the angle of the tapered surface and the block coefficient of friction serve to lock the winding blocks in their final positions, thereby maintaining the compression in winding modules 16. In this context, the stiffness of winding modules 16 is selected using various materials to develop sufficiently small residual stresses in the winding, thereby avoiding damage to the winding and its insulation. An objective is a "tight" winding after the initial spin, without over-stressing the winding components.

The rotor assembly of the invention may alternatively be constructed of a rotor forging 12 that does not include fins 22. In this context, a block 24 is placed between each respective pair of successive field windings 26.

Figure 3:
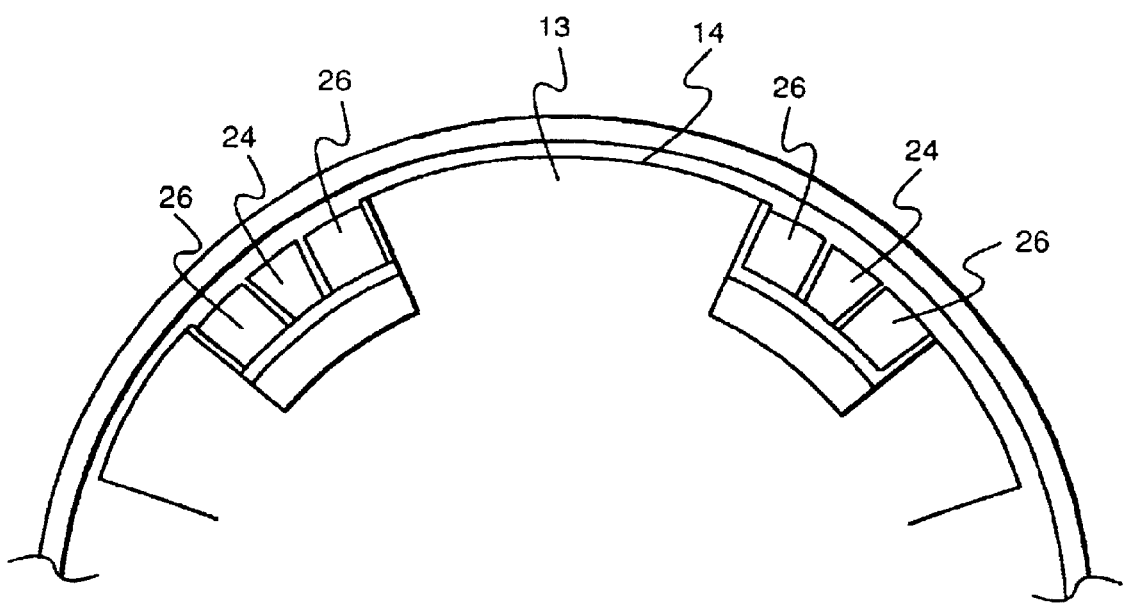
FIG. 3 illustrates an alternative arrangement for effecting blocking of the rotor windings shown in FIG. 1.

Moreover, the blocks or corresponding structure may be fixed in the assembly with an oppositely wedged construction, whereby the field windings are compressed by radial displacement across the blocks during rotation. An example of this construction is illustrated in FIG. 3, wherein winding blocks 24 are fixedly positioned adjacent windings 26. In operation, as the rotor assembly is rotated at about its rated speed, winding modules 16 are displaced radially outwardly over winding blocks 24, thereby compressing the windings. Similar to the embodiment of FIG. 1, the angle of the tapered surface and coefficient of friction of winding blocks 24 serve to lock the assembly in a final compressed position. Thus a final position of winding blocks 24 relative to windings 26 can be effected by displacement of the winding blocks, for example as shown in FIG. 1, or by displacement of the windings, for example as shown in FIG. 3.

As described above, a robust field winding blocking system thus serves to control the winding position and reduce its alternating radial movements. The winding blocks provide adequate pre-stress to keep the winding tight over the design range of spin speeds and provide a well-defined reference position preventing peripheral dissymmetry in the rotor.

While only certain preferred features of the invention have been illustrated and described, many modifications and changes will occur to those skilled in the art. It is therefore, to be understood that the appended claims are intended to cover all such modifications and changes as fall within the true spirit of the invention.

What is claimed is:

1. A rotor assembly comprising;
   a rotor forging including a rotor body having pole faces;
   a winding module including a plurality of field windings positioned adjacent the pole faces and a winding insulator disposed, respectively, between each pair of successive field windings, respectively; and
   a winding block disposed in engagement with the winding module; said winding block configured to be radially shifted to a final reference position relative to said winding module to induce pre-stress in the winding module when said rotor assembly rotates about its rated spin speed;
   wherein said winding block removable from said final reference position is adapted to be self-locked at said final reference position to maintain said pre-stress induced in said winding module when said rotor assembly spin speed is altered to a second speed.

2. A rotor assembly according to claim 1, wherein said winding block comprises at least one tapered surface engaging said winding module, said tapered surface configured to arrest further radial movement of said winding block from said final reference position relative to the winding module when said rotor assembly spin speed is altered to a second speed.

3. A rotor assembly according to claim 1 wherein said winding block comprises a flexible insulating material.

4. A multi pole electric machine rotor assembly comprising;
   a rotor forging including a rotor body having poles directed along a direct axis with pole faces extending generally perpendicularly to a direct axis, and fins extending along a quadrature axis;
   a winding module including a plurality of field windings positioned in spaces between said pole faces and said fins, and a winding insulator disposed between each successive pair of said field windings, respectively; and
   a winding block disposed between the winding module and a corresponding one of said fins in each respective one of said spaces between said pole faces and said fins; said winding block configured to be radially shifted to a final reference position relative to said winding module to induce pre-stress in the winding module when said rotor assembly rotates about its rated spin speed;
   wherein said winding block removable from said final reference position is adapted to be self-locked at said final reference position to maintain said pre-stress induced in said winding module when said rotor assembly spin speed is altered to a second speed.

5. A rotor assembly according to claim 4, wherein said winding block comprises at least one tapered surface engaging said winding module, said tapered surface configured to arrest further radial movement of said winding block from said final reference position relative to the winding module when said rotor assembly spin speed is altered to a second speed.

6. A rotor assembly according to claim 4, wherein said winding block comprises a flexible insulating material.

* * * * *